2,822,313
Patented Feb. 4, 1958

2,822,313

FUNGICIDAL COMPOSITIONS CONTAINING ARYL DIHALO TRIAZINES

Kenneth G. Nolan, Noroton Heights, Conn., and William B. Hardy, Bound Brook, N. J., assignors to American Cyanamid Company, New York, N. Y., a corporation of Maine No Drawing. Application July 16, 1954
Serial No. 443,973

14 Claims. (Cl. 167—33)

This invention relates to new and useful improvement in fungicidal compositions. More particularly, it relates to new fungicidal compositions comprising aryldihalotriazines. More specifically, the invention relates to methods of protecting agricultural, organic and related articles from attack by micro-organisms.

The term "fungicide" as used in this specification and claims is meant to include not only a material having the property of destroying fungi, but also the property of inhibiting the germination of the spores of the fungi. Materials available in the past have not been wholly satisfactory for these purposes. It is, therefore, the object of our invention to prepare a composition of matter which is suitable commercially for distribution and which will be more generally acceptable for the purpose.

According to the present invention, it has been found that certain compounded mixtures containing aryldihalotriazines possess unusual fungicidal properties. These aryldihalotriazine-containing compositions are particularly effective in preventing and retarding fungus growth on seeds, soils, plants, fruits, fur, leather, cotton, wood and other organic matter.

Typical aryldihalotriazines of our invention may be represented by the following structure:

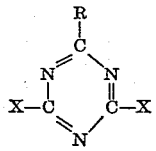

wherein X is a halogen substituent, such as bromine, chlorine and iodine; and R is an aromatic radical of the benzene and naphthalene series which may be substituted by various diverse substituents. Illustrative of the latter substituents are: hydrogen, alkyl from 1–18 carbon atoms, alkoxy from 1–18 carbon atoms, hydroxy, halogen, nitro, amino, carboxy, and the like.

As exemplary of the compounds having the above general formula falling within the purview of our invention are: 2-phenyl-4,6-dichloro - 1,3,5 - triazine, 2-phenyl-4,6-dibromo-1,3,5-triazine, 2-naphthyl-4,6-dichloro-1,3,5-triazine, 2-naphthyl-4,6-dibromo-1,3,5-triazine and substituted aryl derivatives of these compounds, such as 2-methylphenyl-4,6-dichloro-1,3,5-triazine, 2-methoxyphenyl-4,6-dichloro-1,3,5-triazine, 2-bromomethoxyphenyl-4,6-dichloro-1,3,5-triazine, 2-dichloromethoxyphenyl-4,6-dichloro - 1,3,5 - triazine, 2-dibromomethoxyphenyl-4,6-dichloro-1,3,5-triazine, 2-nitromethylphenyl-4,6-dichloro-1,3,5-triazine, 2-chlorophenyl-4,6-dichloro-1,3,5-triazine, 2-chloromethoxyphenyl-4,6-dichloro-1,3,5-triazine, 2-carboxyphenyl-4,6-dichloro-1,3,5-triazine, 2-chlorocarboxyphenyl-4-6-dichloro-1,3,5-triazine, 2(2-methoxy-5-methylphenyl)-4,6-dichloro-triazine, 2(2-ethoxy-5-methylphenyl)-4,6-dichlorotriazine, 2(2-methoxy-5-ethylphenyl)-4,6-dichlorotriazine. 2(2 - methoxy - 5 - butylphenyl)-4,6-dichloro-1,3,5-triazine, 2-orthohydroxyphenyl-4,6-dichloro-1,3,5-triazine, 2-ortho-methoxyphenyl-4,6-dichloro-1,3,5-triazine, 2-ortho-carboxyphenyl-4,6-dichloro-1,3,5-triazine, 2(3,5 - dichloro-2-methoxyphenyl)-4,6-dichloro-1,3,5-triazine, 2(3,5-dibromo-2-hydroxyphenyl)-4,6-dichloro-1,3,5-triazine, 2(3-nitro-2-methoxyphenyl)-4,6-dichloro-1,3,5-triazine. Although some of these compounds are known as dyestuff intermediates, it has been found that these compounds are surprisingly effective as fungicides and that when formed into the compositions of our invention are highly useful and commercially acceptable for the purpose.

In general, the aryldihalotriazine ingredient of the compositions of our invention is readily synthesized. Methods therefor are known in the art. As illustrative, thereof, an aroyl halide having the desired aroyl grouping is initially reacted with dicyandiamide to form an aroyldicyandiamide. The latter is hydrolized to a biuret which is thereafter ring-closed with alkali to form a 2-aryl-4,6-dihydroxy-1,3,5-triazine, and the triazine is then transformed into the corresponding 2-aryl-4,6-dihalotriazine by means of a phosphorus pentahalide. In the copending application of Munro, Hardy and Joyce, Serial No. 348,112, filed April 10, 1953, now Patent No. 2,691,019, a method is noted for the production of ortho-hydroxyphenyl-dichloro-and dibromo-triazines which involves the dealkylation of a 2-ortho-alkoxy-aryl-4,6-dihalo-1,3,5-triazine by treatment with a hydrogen halide in an organic solvent at an elevated temperature.

As stated heretofore, it is preferred to incorporate the aryldihalotriazines in a variety of suitable carriers or diluents. As one of the advantages of our invention, the fungicidal compounds are quite effective in extremely dilute concentrations.

Fungicidal compositions can be prepared either as a suspension in a suitable non-solvent or as a dust. Suspensions or dispersions of the aryldihalotriazines in a non-solvent, such as water, are advantageously employed in the treatment of plant foliage.

For the protection of fruits, seeds, plant tubers and the like during storage, it may be advantageous to treat the latter by employing an aqueous emulsion of the fungicide. The emulsion may be formed by dissolving the fungicide in an oil and the solution emulsified in water. The oil which we can use as solvent for the aryldihalotriazines are hydrocarbons such as for example benzene and toluene; and halogenated hydrocarbons, such as chlorobenzene, chloroform, fluorotrichloromethane and dichlorodifluorodichloromethane.

The compounds of our invention may further be applied to foliage by the so-called aerosol method. Solutions for the aerosol treatment are prepared either by dissolving the chemical directly in a highly volatile liquid carrier such as trifluoromethane or by dissolving the chemical in a lesser volatile solvent such as benzene and then admixing such solution with the highly volatile liquid aerosol carrier.

Fungicidal dusts may be prepared by mixing the instant aryldihalotriazines with dusting materials as for example, clay, pyrophyllite, bentonite, pumice, fuller's earth and the like. In this manner, seeds can be protected from soil organisms harmful to them by incorporating the present compounds with a solid carrier and admixing the composition with the seed as by tumbling.

Although we may use a wide weight range of fungicidal compound to inert carrier or diluent, namely up to about 10% by weight of compound based upon the weight of the inert additive, we have found that from 0.01% to 1% of active ingredient, and preferably 0.13%, is entirely adequate for aqueous dispersion preparations. However, as a dust composition, 5% of active ingredient is satisfactory for most applications.

When the fungicidal compounds are employed in an aqueous suspension, the composition may advantageously contain a dispersing agent for the compound. Examples of such dispersing or surface active agents that can be utilized in forming these dispersions include the fatty acid esters of polyhydric alcohols, such as "Span," the sodium salt of a polymerized propyl naphthalene sulfonic acid known as "Daxad 11," formed by condensing formaldehyde with a propyl naphthalene sodium sulfonate, the alkylarylpolyether alcohols, such "Triton X-100," the ethylene oxide addition products of such esters as for example "Tween," and the like. Usually, from one to five parts of dispersing agent per 100 parts of fungicide is a good range.

The invention is further illustrated by the following examples but it is not limited thereto. Unless otherwise noted, the parts are given by weight.

*Example 1*

In this example, the toxic agents of the present invention were tested for fungicidal action on spores of *Sclerotinia fructicola* and *Macrosporium sarcinaeforme* which are fungi parasitic on stone fruits and clover, respectively.

In carrying out this test, the organisms referred to above were easily cultured on potato dextrose agar slants and their spores were readily visible under low-power magnification. These spores were obtained in abundance from 7-day-old cultures of *Macrosporium sarcinaeforme* and 14-day-old cultures of *Sclerotinia fructicola*. The spores are washed from the agar slants with distilled water, and are adjusted to a concentration of approximately 50,000 spores per cc. of water. Representative aryldihalotriazine compounds were dispersed in water in various concentrations given in the table below; aliquots of this dispersion were then placed in separate vials with the definite concentration of the spores as indicated above. In runs 1 to 6 below, no dispersing agent was added to the mixture, whereas in runs 7 to 12, 1 part of "Daxad 11" to 100 parts of fungicide was mixed with the fungicide prior to dispersing the latter in water. The suspension of spores in the toxic agent was then kept mixed in a tumbling machine for a period of 24 hours. At the end of this time, the spores were examined under the microscope for germination. The results of these tests are presented in the foregoing table.

*Example 2*

About twenty-four hours before treatment with an aqueous dispersion of 2-o-methoxyphenyl-4,6-dichloro-1,3,5-triazine, apple tree foliage is inoculated with spores of *Venturia inaequalis*, the fungus which causes a disease known as apple scab. After the 24-hour infection period, an aqueous dispersion of the latter triazine, prepared by dispersing one-half part of said triazine in eight hundred parts of water, is sprayed on the thus infected apple tree foliage. It is observed that the treatment with 2-o-methoxyphenyl-4,6-dichloro-1,3,5-triazine is highly effective in the eradication of the fungus without phytotoxicity to the foliage.

*Example 3*

In this example, the procedure of Example 2 is repeated except that one part of 2-ortho-chlorophenyl-4,6-dichloro-1,3,5-triazine to eight hundred parts of water is substituted for the aqueous dispersed triazine compound therein. In order to obtain rapid dispersion of the triazine compound, 0.01 part of "Daxad 11" is admixed with the triazine compound. The treatment eradicated the fungus, indicating the effectiveness of 2-o-chlorophenyl-4,6-dichloro-1,3,5-triazine as a fungicide.

While the fungicidal composition of our invention can be used either as a powder or in inert liquid compositions, other active ingredients may be added thereto to prepare a multi-purpose preparation. Such other active ingredients can be used as the carrier per se or, in addition, an inert carrier can also be used. These active ingredients in admixture can be herbicides, parasiticides, insecticides, fertilizers and the like. Thus, for example, an effective dose of aryldihalotriazine toxic agent and insecticide, such as Parathion or DDT suspended in water in the presence of a dispersing agent, can be employed as a multi-purpose preparation.

We claim:

1. A preparation for the control of fungi comprising a symmetrical triazine represented by the formula:

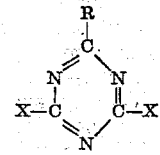

in which R is an aryl radical selected from the group consisting of phenyl, naphthyl, alkylphenyl, monohalophenyl, dihalophenyl, hydroxyphenyl, and alkoxyphenyl and X is a halogen selected from the group consisting of chlorine and bromine, and a fungicidal adjuvant therefor, said adjuvant comprising a surface active agent.

2. A preparation according to claim 1 in which an aqueous suspension of the triazine is provided.

3. A preparation according to claim 1 in which the triazine is 2-o-methoxyphenyl-4,6-dichloro-1,3,5-triazine.

4. A preparation according to claim 1 in which the triazine is 2-o-hydroxyphenyl-4,6-dichloro-1,3,5-triazine.

5. A preparation according to claim 1 in which the triazine is 2-o-chlorophenyl-4,6-dichloro-1,3,5-triazine.

6. A preparation according to claim 1 in which the triazine is 2-o-methylphenyl-4,6-dichloro-1,3,5-triazine.

7. A preparation according to claim 1 in which the

| Run No. | Compound | Percent Kill | | | | | |
|---|---|---|---|---|---|---|---|
| | | *Macrosporium sarcinaeforme*, Percent Conc'n | | | *Sclerotinia fructicola*, Percent Conc'n | | |
| | | 0.01 | 0.001 | 0.0001 | 0.01 | 0.001 | 0.0001 |
| 1 | 2-(3,5-dichloro-2-hydroxyphenyl)-4,6-dibromo-1,3,5-triazine | 50 | 0 | | 95 | 0 | |
| 2 | 2-(3,5-dichloro-2-hydroxyphenyl)-4,6-dichloro-1,3,5-triazine | | 100 | 0 | | 100 | 0 |
| 3 | 2-o-methylphenyl-4,6-dichloro-1,3,5-triazine | | 100 | 50 | | 100 | 50 |
| 4 | 2-o-chlorophenyl-4,6-dichloro-1,3,5-triazine | | 95 | 50 | | 100 | 80 |
| 5 | 2-o-methoxyphenyl-4,6-dichloro-1,3,5-triazine | | | 95 | | | 95 |
| 6 | 2-o-hydroxyphenyl-4,6-dichloro-1,3,5-triazine | | 95 | 0 | | 100 | 0 |
| 7 | 2-(4-chloroformylphenyl)-4,6-dichloro-1,3,5-triazine | | 95 | 50 | | 100 | 25 |
| 8 | 2-(3-chloroformylphenyl)-4,6-dichloro-1,3,5-triazine | | 100 | 50 | | 100 | 50 |
| 9 | 2-(3-nitro-2-methoxy-phenyl)-4,6-dichloro-1,3,5-triazine | | 100 | 75 | | 95 | 50 |
| 10 | 2-(3,5-dibromo-2-methoxy-phenyl)-4,6-dibromo-1,3,5-triazine | 100 | 0 | | 50 | 0 | |
| 11 | 2-(2'-methoxy-5-methyl phenyl)-4,6-dichloro-triazine | | 100 | | | 100 | |
| 12 | 2-(1-naphthyl)-4,6-dichloro-triazine | | 90 | 50 | | 95 | 50 | triazine is 2(3,5-dichloro-2-hydroxyphenyl)-4,6-dibromo-1,3,5-triazine.

8. A method for the protection of organic materials susceptible to attack by fungi which comprises: applying to said organic material a preparation comprising: a symmetrical triazine represented by the formula:

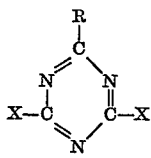

in which R is an aryl radical selected from the group consisting of phenyl, naphthyl, alkylphenyl, monohalophenyl, dihalophenyl, hydroxyphenyl, and alkoxyphenyl and X is a halogen selected from the group consisting of chlorine and bromine, and a fungicidal adjuvant therefor, said adjuvant comprising a surface active agent.

9. A method for the protection of organic materials susceptible to attack by fungi which comprises: applying to said organic material an aqueous suspension of a symmetrical triazine represented by the formula:

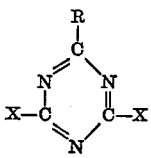

in which X is a halogen selected from group consisting of chlorine and bromine and R is an aryl radical selected from the group consisting of phenyl, naphthyl, alkylphenyl, monohalophenyl, dihalophenyl, hydroxyphenyl, and alkoxyphenyl, said aqueous suspension containing a small amount of a surface active agent.

10. A method according to claim 9 in which the symmetrical triazine is 2-o-methoxyphenyl-4,6-dichloro-1,3,5-triazine.

11. A method according to claim 9 in which the symmetrical triazine is 2-o-hydroxyphenyl-4,6-dichloro-1,3,5-triazine.

12. A process according to claim 9 in which the symmetrical triazine is 2-o-chlorophenyl-4,6-dichloro-1,3,5-triazine.

13. A process according to claim 9 in which the symmetrical triazine is 2-o-methylphenyl-4,6-dichloro-1,3,5-triazine.

14. A process according to claim 9 in which the symmetrical triazine is 2(3,5-dichloro-2-hydroxyphenyl)-4,6-dibromo-1,3,5-triazine.

References Cited in the file of this patent
UNITED STATES PATENTS

| | | |
|---|---|---|
| 1,911,689 | Hentrich et al. | May 30, 1933 |
| 2,325,803 | Schmidt et al. | Aug. 3, 1943 |
| 2,510,564 | Dudley | June 6, 1950 |
| 2,671,787 | Bortnick | Mar. 9, 1954 |
| 2,728,767 | Wolf | Dec. 27, 1955 |

FOREIGN PATENTS

| | | |
|---|---|---|
| 680,652 | Great Britain | Oct. 8, 1952 |